UNITED STATES PATENT OFFICE.

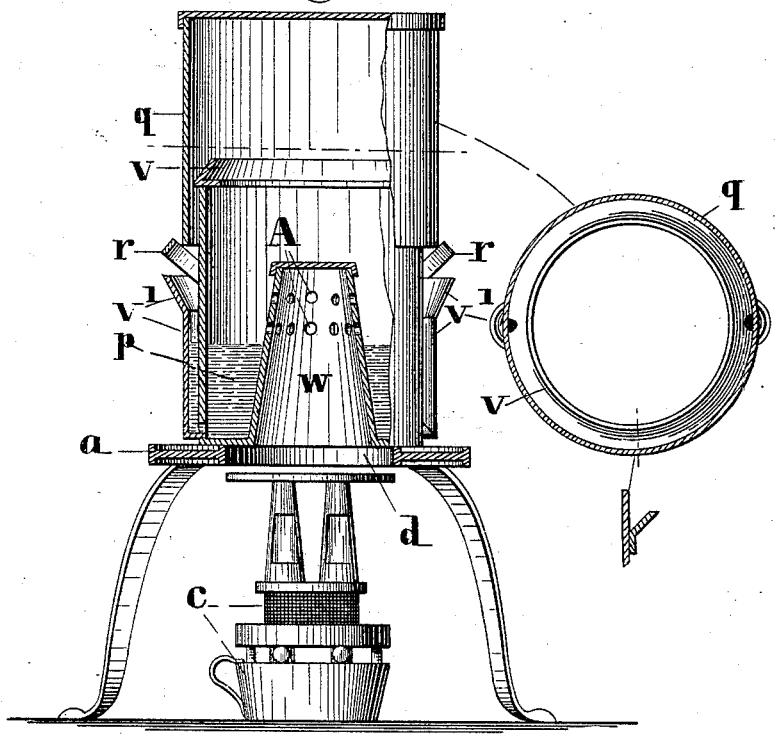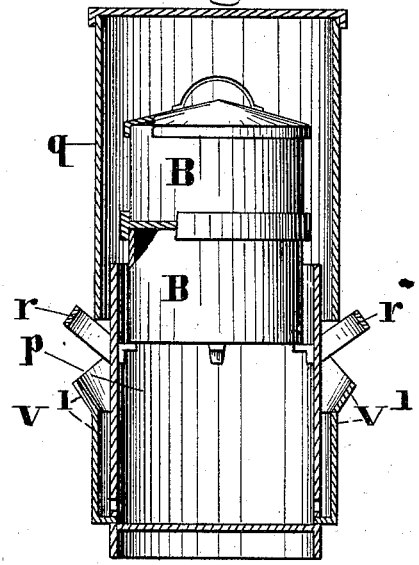

CLARK S. WEST, OF BOSTON, MASSACHUSETTS, ASSIGNOR TO THE WEST OIL STOVE COMPANY, OF NEW JERSEY.

STEAM COOKER.

SPECIFICATION forming part of Letters Patent No. 284,104, dated August 28, 1883.

Application filed January 31, 1883. (No model.)

*To all whom it may concern:*

Be it known that I, CLARK S. WEST, of Boston, in the county of Suffolk and State of Massachusetts, have invented certain Improvements in Steam Heaters and Cookers, of which the following is a specification.

This invention has for its object to provide for use in connection with an oil-stove a steam heater and cooker of novel construction, adapted to condense the steam used in heating and cooking and prevent the escape of the steam, gases, and odors into the room.

To this end my invention consists in the improvements which I will now proceed to describe and claim.

Of the accompanying drawings, forming a part of this specification, Figure 1 represents a longitudinal vertical section of the invention, and Fig. 2 a vertical section of a modification of the same.

In the drawings, $a$ represents a base or platform supported by legs at a sufficient height above the floor to permit an oil-stove, $c$, to be inserted under said platform, said stove being preferably constructed as shown in Letters Patent No. 231,695, granted to me August 31, 1880. The platform $a$ has an opening, $d$, under which the stove is placed, and through which the heated air and products of combustion pass to a steam heater or cooker on the platform $a$, which heater will now be described.

$p$ represents a water-tank adapted to rest over the hole $d$ in the platform $a$, and $q$ represents a drum with a closed top, which is placed over the tank $p$. Steam is generated in the tank $p$ and rises to the drum $q$, for heating or cooking purposes. The drum $q$ is provided with an opening or openings at its base, for the admission of cold air to condense the steam upon the internal surface of the drum. Said opening may be formed by making the drum larger than the tank, as shown in Fig. 1, so that a space will be formed between the tank and drum for the upward passage of cool air, the drum projecting downwardly some distance over the tank, so that the steam will not escape laterally through said space, but in its upward motion will draw the cool outside air upwardly into the drum. The drum is supported by handles $r\ r$ or other suitable supports on the tank. When the drum is made larger than the tank, as just described, I provide the interior of the drum with a trough, $v$, to catch the condensed water that flows down the sides of the tank. Said trough has one or more openings, and when the drum is in place on the tank said openings are directly over the enlarged mouths of tubes $v'\ v'$ on the exterior of the tank, said tubes communicating with the lower portion of the interior of the tank, and thus returning to the latter the water of condensation.

The tank, when used as a heater, may have a frustum of a cone, W, in its bottom, forming a chamber, into which the heated air passes from the stove or lamp, and provided with orifices A in its upper portion, above the water-line, for the passage of heated air and products of combustion into the tank and drum. Any gases or unpleasant odors that may be present in the products of combustion are mingled with the steam and vapor in the drum and condensed therewith, so that they do not escape from the drum.

When the tank and drum are used for cooking purposes, the bottom of the tank is preferably made flat and raised somewhat above the lower edge, as shown in Fig. 2, and one or more removable receptacles, B B, are supported by the tank and covered by the drum.

It will be seen that the steam cooker thus constructed entirely prevents evaporation of the food.

I claim—

1. The tank $p$, having the tubes $v'$, in combination with the drum $q$ and trough $v$, having openings in line over the tubes, as and for the purpose described.

2. The water-tank $p$, having the cone W, open below to receive the products of combustion, and open above, over the water-line, to deliver the same to the steam-chamber.

In testimony whereof I have signed my name to this specification, in the presence of two subscribing witnesses, this 17th day of January, 1883.

CLARK S. WEST.

Witnesses:
C. F. BROWN,
N. L. WHITE.